Sept. 7, 1965  J. PICKLES  3,204,946
POWER TRANSMISSION TO A VENT WING ACTUATOR
Filed April 1, 1963
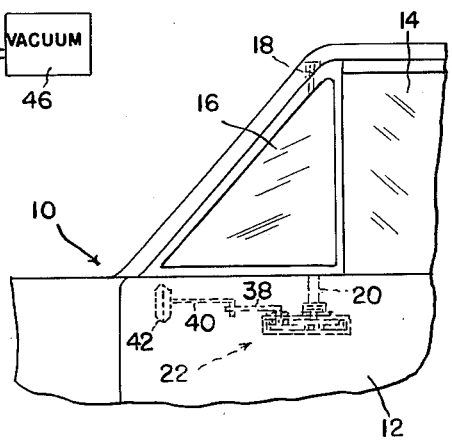
FIG. 2.
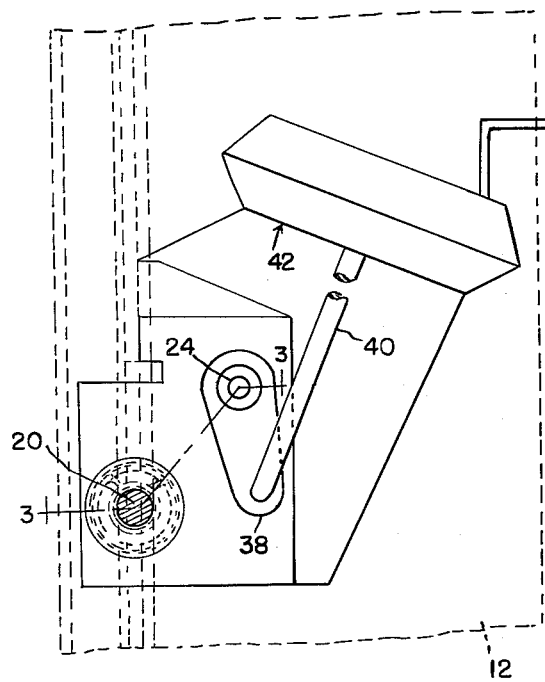
FIG. 1.
FIG. 4.
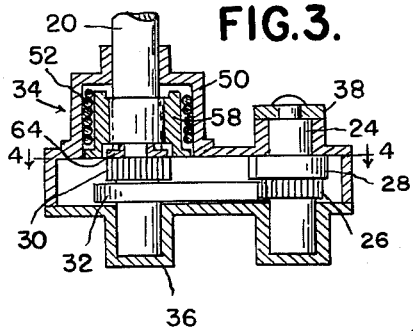
FIG. 3.
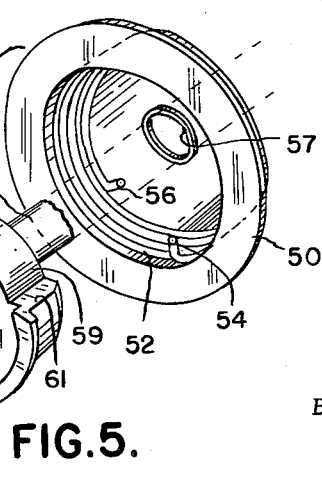
FIG. 5.
INVENTOR.
JOSEPH PICKLES
BY Whittemore, Hulbert
  & Belknap
  ATTORNEYS

United States Patent Office 3,204,946
Patented Sept. 7, 1965

3,204,946
POWER TRANSMISSION TO A VENT WING
ACTUATOR
Joseph Pickles, Dearborn, Mich., assignor to Ferro Manufacturing Corporation, a corporation of Michigan
Filed Apr. 1, 1963, Ser. No. 269,271
1 Claim. (Cl. 268—121)

The present invention relates to a power transmission and more particularly to a power operated vent window construction.

The present invention is designed to provide power assistance for the opening and closing of the vent windows of modern automobiles. The transmission for the vent window is mounted in the corresponding front door and includes a pair of parallel shafts, each of which has connected thereto in driving relation a pair of toothed elements having widely different ratio. Upon rotation of the input shaft, the output shaft, which is operatively connected to the vent window, is rotated at a relatively high speed with a relatively low mechanical advantage through the meshed engagement of one pair of toothed elements. This rotation occurs during movement of the vent window from an opened position to an intermediate position near the closed position. Thereafter, the final closing movement of the vent window is accomplished at a relatively lower speed with a relatively high mechanical advantage through the meshed engagement of the other pair of toothed elements so as to provide a substantially large actuating force for completely closing the vent window.

It is an object of the present invention to provide a power transmission for a vent window of an automobile wherein the power transmission is designed to move the vent window at two different speeds and to provide a substantially greater actuating force when moving the vent window to the completely closed position during the final closing movement thereof than the actuating force provided during the initial closing thereof.

Another object of the present invention is to provide a power operated vent window construction comprising an output shaft, a vent window operatively connected to the output shaft and movable at different rates between closed and opened positions upon rotation of the output shaft, an input shaft, a double sector toothed member having teeth arranged on a small diameter and on a large diameter fixedly carried by each of the shafts, with the teeth on the small diameter of the member on each shaft adapted to engage the teeth on the large diameter of the member on the opposite shaft, the teeth on the small diameter of the member on one of the shafts and the corresponding teeth on the large diameter of the member on the other shaft constituting a first set of teeth, the remaining teeth constituting a second set of teeth, and power operated means for rotating the input shaft to effect movement of the output shaft and vent window between closed and opened positions at different rates of movement through the meshed engagement between the first set of teeth and then the second set of teeth respectively.

Still another object of the present invention is to provide a structure of the aforementioned type wherein the sets of teeth are in overlapping meshed engagement for a brief period of time when changing from the first set of teeth to the second set of teeth.

A further object of the present invention is to provide a structure of the aforementioned type wherein means are provided for preventing rotation of the output shaft except through the input shaft and the two sets of teeth.

Another object of the present invention is to provide a structure of the aforementioned type wherein a spring clutch is mounted on the output shaft for preventing rotation thereof except through the input shaft and the two sets of teeth.

Still another object of the present invention is to provide a structure of the aforementioned type wherein an arm is mounted on the input shaft and the power operated means is connected to the arm to swing the arm and input shaft on actuation thereof.

A further object of the present invention is to provide a structure of the aforementioned type wherein each of the double sector toothed members comprises a pair of toothed elements, one of the elements being in the form of a gear and the other element in the form of a gear sector having the teeth thereon arranged on a diameter which is larger than the diameter of the teeth on the gear.

Another object of the present invention is to provide a power operated vent window construction of the aforementioned type wherein the power operated means is in the form of a fluid motor which is adapted to be connected to a source of vacuum developed by the engine of the automobile.

It is thus another object of this invention to provide a simplified low-cost structure of the aforementioned type having certain advantages contributing to efficiency, reliability and long life as well as ease of maintenance.

Further objects and advantages of the present invention will be apparent from the following description, reference being had to the accompanying drawing wherein a preferred form of the present invention is clearly shown.

FIGURE 1 is a fragmentary elevational view of an automobile illustrating the power transmission connected to the vent window.

FIGURE 2 is a plan view illustrating the component parts of the power transmission.

FIGURE 3 is a sectional view taken on line 3—3 of FIGURE 2.

FIGURE 4 is a sectional view taken on line 4—4 of FIGURE 3.

FIGURE 5 is a pictorial view of the component parts of the disassembled spring clutch.

Referring now to the drawing, the automobile is designated by the numeral 10 and includes a door 12 which carries a side window 14 and a vent window 16 as is well known in the art. The vent window 16 is mounted for swinging movement about an upper shaft or pivot 18 and a lower shaft or pivot 20 which are carried by the vent window frame provided on the door 12. The vent window 16 is adapted to be actuated by a suitable power transmission 22 which is mounted in the interior of the door 12 hidden from view.

The vent window shaft 20 is hereinafter referred to as the output shaft 20 and forms part of the power transmission 22. The transmission 22 includes an input shaft 24 having fixedly mounted thereon a gear or pinion 26 and a gear sector 28. The teeth provided on the gear 26 are located on a smaller diameter than the teeth provided on the gear sector 28. The output shaft 20 has a gear or pinion 30 and a gear sector 32 which are loosely mounted thereon as will be subsequently described. The gear 30 is of the same diameter and size as the gear 26, while the gear sector 32 is of the same size and tooth diameter as the gear sector 28.

Mounted adjacent gear 30 on the output shaft 20 is a spring clutch 34 of the friction type which will be subsequently described. The purpose of the spring clutch 34 is to prevent rotation of the output shaft 20 except when being driven by the input shaft 24 and the gear elements associated therewith. In other words, a person taking hold of the vent window 16 could not manually move or swing the vent window 16. The only way the vent window 16 can be moved is by power operated transmission 22.

The spring clutch 34 and the various gears and gear sectors aforesaid are all contained within a housing 36 which is shaped as illustrated in FIGURES 3 and 4. Mounted on top of the input shaft 24 is an arm 38. One end of the arm 38 is fastened to the input shaft 24 while the other end of the arm 38 is connected by a rod 40 to a fluid operated motor 42. The fluid operated motor 42 contains the usual diaphragm assembly which divides the housing thereof into a pair of fluid chambers. The motor 42 is adapted to be connected to a source of vacuum 46 which may be either venturi vacuum, manifold vacuum, or any combination thereof.

The spring clutch 34 per se is not a part of this invention. The use and operation of the spring clutch 34 is well known in the art. Clutch 34 includes a housing 50 having a closely wrapped coil spring 52 abutting the inner periphery thereof as best illustrated in FIGURE 5. The coil spring 52 has ends 54 and 56 extending radially inwardly and located approximately 90° apart. The output shaft 20, which extends through an opening 57 in the top wall of the housing 50, fixedly carries an element 58 on a reduced portion 53 thereof.

The element 53 is substantially cylindrical with notches 59 and 60 being provided in the periphery thereof. The element 53 is provided with substantially radially extending abutment surfaces 61 and 62 at opposite ends of notch 59 which are engageable with the ends 54 and 56 provided on the coil spring 52.

A disc 64 is provided with a lug 66 at one side thereof which has a circumferential extent of slightly less than 90° and is adapted to be received in the space or notch 59 between the abutment surfaces 61, 62 and housing 50. The longitudinal edges of the lug 66 are provided with notches 68 and 70 for the ends 54 and 56 respectively.

The disc 64 has a centrally located opening. The small gear 30 is provided with a tubular extension 74 on which is mounted the gear sector 32. The gear 30 and its extension 74 is fixedly secured to disc 64 and the entire assembly is sleeved over the end portion 53 of the shaft 20 with limited relative motion therebetween.

Initially, when the output shaft 20 and vent window 16 are to be driven through the input shaft 24 and the gear elements associated therewith, one of the longitudinal edges of the lug 66 is brought into engagement with corresponding abutment surface 60 or 61, depending on the direction of rotation, and drives element 58 and hence the output shaft 20 in the desired direction. This force is sufficient to overcome the friction between spring 52 and housing 50 and as a result thereof the spring 52 is rotated in the same direction since the ends 54 and 56 thereof are enclosed between the longitudinal edges of the lug 66 and the element 58.

However, if a force is applied directly to the vent window 16 the output shaft 20 is not rotated due to the fact that one of the abutment surfaces 61 or 62 on element 58 urges the corresponding end of spring 52 in an outward direction to expand the spring 52 which tightly grips the wall of the housing 50 so as to increase the amount of friction therebetween.

The spring clutch 34 is therefore effective to permit rotation of the output shaft 20 through the input shaft 24 and the gear elements associated therewith but prevents roation of the output shaft 20 when the force is directly applied thereto.

Suitable switches are provided on a control panel in the automobile for controlling the opening and closing of both vent windows. The switches control the application of the vacuum to the fluid motors 42 as is well known in the art.

It should be understood that either of the small gears and the corresponding large gear sector may be formed separately as illustrated or formed in one piece. The term "double sector toothed member" includes either type of construction. The essential feature of either type of construction is that certain of the teeth in a double sector toothed member are arranged on a small diameter, while the remaining teeth are arranged on a large diameter as is best illustrated in FIGURE 4.

The teeth on gear 26 and the teeth on the mating gear sector 32 constitute one set of teeth while the teeth on gear 30 and the mating gear sector 28 constitute another set of teeth.

FIGURE 4 illustrates the position of the power transmission 22 when the vent window 16 is completely closed. In operation a switch is actuated in a direction to cause the fluid motor 42 to urge rod 40 in a direction to swing arm 38 in the direction of arrow A so as to rotate gear 26 in a counterclockwise direction. As a result thereof gear sector 32 is rotated by gear 26 in a clockwise direction as indicated by arrow B to move the window from the completely closed position to an intermediate substantially closed position. This initial opening movement is at relatively low speed but at a high force due to the ratio of the gear 26 and gear sector 32.

At the time that a tooth on the gear 26 is in mating engagement with the last tooth on the gear sector 32, the first and leading tooth on the gear sector 28 comes into mesh with a tooth on the gear 30. For a brief period of time both sets of teeth are in driving engagement. Thereafter gear 26 and sector 32 move apart while sector 28 continues to drive gear 30 at a relatively higher speed than attained previously and at a lower force. As a result thereof the vent window 16 is moved from the substantially closed position to its completely opened position very rapidly. When the fluid motor 42 is operated in the opposite direction the vent window 16 is moved at relatively high speed to an intermediate substantially closed position where gear 26 and gear sector 28 take over to continue to move the vent window 16 to the final closed position at a reduced rate of speed but resulting in a corresponding large actuating force to insure complete closing of vent window 16.

The drawing and the foregoing specification constitute a description of the improved power transmission to a vent wing actuator in such full, clear, concise and exact terms as to enable any person skilled in the art to practice the invention, the scope of which is indicated by the appended claim.

What I claim as my invention is:

A power operated vent window construction comprising a frame having a window opening therein, a rotatable vertically extending output shaft, a vent window in said opening operatively connected to said output shaft and adapted to swing laterally of said opening at different rates of movement between the completely closed position and the fully opened position upon rotation of said output shaft, a rotatable vertically extending input shaft, a relatively large gear sector and a relatively small pinion carried by each shaft one above the other in superimposed relationship, the arrangement of the gear sector and pinion on one shaft being in reverse order to the arrangement of the gear sector and pinion on the other shaft, the teeth on each pinion being located on a uniform pitch diameter, the teeth on each gear sector being located on a uniform pitch diameter which is larger than the uniform pitch diameter of the teeth of each pinion, with the teeth of the pinion on each shaft engageable with the teeth of the gear sector on the opposite shaft, the teeth on said pinion on one of said shafts and the corresponding teeth on the gear sector on the other of said shafts constituting a first set of teeth with the remaining teeth on the other pinion and gear sector constituting a second set of teeth, an actuating arm fixedly connected to said input shaft, vacuum responsive power operated means operatively connected to said actuating arm for rotating said arm and input shaft to effect rotation of said output shaft and swinging movement of said vent window in said opening through the meshed engagement between said first set of teeth and then said second set of teeth respectively, and a positive acting friction clutch surrounding said output shaft for preventing rotation of said output shaft except through said input shaft and said gear sectors and pinions, the teeth of the gear sector on the input shaft being in meshed engagement with the teeth of the pinion on the output shaft to provide a relatively fast rate of movement for initially swinging the vent window from the fully opened position to an intermediate substantially closed position, the teeth of the remaining pinion and gear sector being in meshed engagement to effect swinging movement of the vent window at a slower rate of movement from the intermediate substantially closed position to the completely closed position, said first and second sets of teeth being in overlapping meshed engagement for a brief period when changing from said first set of teeth to said second set of teeth.

References Cited by the Examiner

UNITED STATES PATENTS 2,034,202   3/36   Paton _____ 296—44.3 XR

FOREIGN PATENTS 624,189   5/49   Great Britain.

HARRISON R. MOSELEY, Primary Examiner.